Patented Oct. 16, 1923.

1,471,213

UNITED STATES PATENT OFFICE.

MORRIS G. SHEPARD, OF NEW YORK, N. Y., AND HAROLD S. ADAMS, OF NAUGATUCK, CONNECTICUT, ASSIGNORS TO THE NAUGATUCK CHEMICAL COMPANY, A CORPORATION OF CONNECTICUT.

MANUFACTURE OF FORMALDEHYDE CONDENSATION PRODUCTS OF ALIPHATIC AMINES AND PRODUCTS OBTAINED THEREBY.

No Drawing. Application filed November 27, 1922. Serial No. 603,659.

*To all whom it may concern:*

Be it known that we, MORRIS G. SHEPARD and HAROLD S. ADAMS, both citizens of the United States, residing at New York, county of New York, and State of New York, and Naugatuck, county of New Haven, State of Connecticut, respectively, have invented certain new and useful Improvements in Manufacture of Formaldehyde Condensation Products of Aliphatic Amines and Products Obtained Thereby, of which the following is a full, clear, and exact description.

The invention relates to the manufacture of formaldehyde condensation products of aliphatic amines and to the products obtained thereby.

The principal object of the present invention is to provide a simple process for the production of such materials which may be easily carried out and which shall provide a high yield of the desired product. Another object is to produce a product which may be satisfactorily employed, for example in the vulcanization of rubber.

The invention accordingly comprises a process which includes causing hexamethylenetetramine, which expression is intended to include a solution of formaldehyde and ammonia or equivalent thereof, to react with an alkyl halide, forming a condensation product of alkyl amine and formaldehyde thereby, and recovering said condensation product.

In carrying out the invention in its preferred form, a solution of 22¾ lbs. of hexamethylenetetramine or corresponding quantity of formaldehyde and ammonia dissolved in 27¼ lbs. of water (total of 50 lbs. of a 13° Bé. solution) is placed in a steam jacketed autoclave capable of withstanding pressures up to 300 lbs. per square inch and provided with a suitable agitating means. 20½ lbs. of ethyl chloride are then added, the autoclave closed and the agitator started. It is advisable to have the jacketed autoclave provided with water and steam connections so that water or steam may be admitted in order to control the temperature of the reaction particularly in its early stages as well as to cool the autoclave down promptly when the reaction is complete and the charges to be withdrawn. The first reaction involved appears to be the addition of the ethyl chloride to the hexamethylenetetramine which is apparently an exothermic reaction. High pressure is developed in the early stages of the reaction probably due to the heat developed by the reaction with consequent expansion of the unchanged ethyl chloride. After the initial high pressures have fallen the pressure inside the autoclave varies practically as the temperature of the apparatus which changes in accordance with the steam pressure present in the jacket.

In actual practice after the closing of the autoclave free steam is admitted to the jacket and the pressure rapidly rises to about 175 lbs. when the steam is shut off. The stirring however is continued. If any further developments of pressure takes place water can be admitted to the jacket. At the end of one-half hour when the internal pressure has fallen to approximately 125 lbs. 80 to 90 lbs. of steam may be applied in the jacket. The pressure now rises again to about 225 lbs. from which point it usually drops back again. Heating under these conditions is continued for one-half hour more and the steam shut off and water admitted to the jacket to cool down the charge, the reaction being now complete. The reaction product is removed and tests for ethyl chloride and hexamethylenetetramine are made. These should be substantially absent.

The reaction product thus obtained appears to consist substantially of triethyltrimethylenetriamine hydrochloride and in order to secure the base free from the hydrochloride the charge so prepared is placed in a still provided with an agitator and a steam coil or jacket. A vapor pipe from this still passes up through a cooling coil which serves to reflux any vapor. The agitator is started and a solution of 50% caustic soda equal in weight to that of the charge is run in gradually. Steam is then admitted to the jacket and stirring continued. Ethyl amine and ammonia are evolved and passed to suitable absorption apparatus. The rate at which the caustic is run in and the amount of heating are regulated in accordance with the rate at which the absorbing system is able to absorb the gases evolved. The steam pressure should not exceed 10 lbs. per square inch. In the course of 1½ hrs. the evolution of gas will stop and a sample drawn from the still should have no strong odor of ammonia or ethyl amine. The contents of the still are allowed to settle and the bulk of the caustic brine is drawn off from the bottom. The remainder is transferred to a settling tank where the final separation of triethyltrimethylenetriamine from the brine is made. The average yield of the crude oil comprising the reaction product triethyltrimethylenetriamine is approximately 26½ lbs. of crude oil. The ethyl amine which together with ammonia is recovered in water solution is a normal product of the reaction, no matter what proportion of ethyl chloride is used. It may be employed again in the process or may be used as desired.

The crude triethyltrimethylenetriamine contains as an impurity a quantity of water with which it is miscible as well as traces of hexamethylenetetramine and caustic soda along with a small quantity of ammonia and ethyl amine. Formaldehyde as such is not revealed upon tests. It appears that the excess of this substance must largely have been converted to polymerized and resinous compounds.

Considerable evidence points also to the probability that triethyltrimethylenetriamine itself has largely undergone polymerization. This polymerization seems to be brought about by heating, and it is effected partly in the autoclave process and partly during the treatment with caustic soda. If a sample of triethyltrimethylenetriamine as prepared by the above process is subjected to steam distillation until no further distillate is obtained and the residue is dehydrated by boiling off the water there results a brittle, dark amber colored resin, soluble in water and having all the accelerating properties of the original triethyltrimethylenetriamine. On the other hand if the reaction between ethyl chloride and hexamethylenetetramine is carried out at 100° C. instead of the higher temperature employed in the process as given above, the reaction being carried on for 24 hrs. and the resulting solution is causticized without heating, there results an almost water white fluid oil. The polymerization does not appear to diminish or enhance the accelerating properties of the triethyltrimethylenetriamine.

The above described method has been chosen as the preferred one during the course of formulation of the invention which has brought out the following facts:

If a theoretical quantity of ethyl halide and hexamethylenetetramine is employed and the addition compound is hydrolyzed by boiling with hydrochloric acid, the nitrogen to which the halide was attached is split off as ethyl amine. The remaining nitrogens of the hexamethylenetetramine appear as ammonia, and the methylene carbons as formaldehyde. With the formaldehyde thus formed, the ethyl amine condenses with the formation of triethyltrimethylenetriamine, which remains in solution in combination with hydrochloric acid as the hydrochloride. The addition of caustic soda liberates the free base which appears as an oil. This procedure involves two steps. The preferred embodiment above given, it will be observed, carries out the reaction in one step, that is the addition product of the hexamethylenetetramine and ethyl halide and the subsequent hydrolysis and condensation of formaldehyde and ethyl amine are accomplished in one step.

Using the theoretical quantity of ethyl halide it has been observed further that only one of the carbon atoms appears in the final product, the rest passing off as formaldehyde. The same waste exists as to the nitrogen atoms in which only one is utilized, remaining passing off as ammonia. Ammonia and ethyl halide however react to form primary ethyl amine, which condenses with the formaldehyde present. It therefore appeared in the formulation of the invention that the addition of an excess of ethyl halide would result in an increased yield and a more economical process with the reaction of ammonia just mentioned. Following these observations the preferred embodiment given above employs an excess of ethyl halide and it has been found that it is economical to use as high as 2 mols. of ethyl halide to 1 of hexamethylenetetramine as described. With the use of four mols. of ethyl halide the process becomes less economical. 3 mols. of ethyl halide have been satisfactorily used.

The triethyltrimethylenetriamine product obtained as described above is an active accelerator of the vulcanization of rubber and has a wide application.

Although the process above described refers to a combination producing triethyltrimethylenetriamine it is applicable to various other similar combinations with formaldehyde as evidenced by the following procedures, all of which have been carried out to provide similar substances having similar accelerating properties to triethyltrimethylenetriamine.

(1.) *Reaction of methyl iodide and concentrated aqueous hexamethylenetetramine solution.*—46 parts of a 13° Bé. aqueous hexamethylenetetramine solution and 42¾ parts of methyl iodide are heated in a sealed tube employing steam. The reaction between the substances occurs easily in the course of approximately 3 hrs. After cooling the mass is treated with an equal volume of 50% aqueous sodium hydroxide with a liberation of formaldehyde ammonia, methyl amine and a non-volatile oil, which latter was separated and after standing several months formed a white mushy crystalline body, possibly a polymer.

(2.) *Reaction of butyl iodide and concentrated aqueous hexamethylenetetramine solution at 100° C.*—46½ parts of 13° Bé. aqueous hexamethylenetetramine is heated under pressure with 40.2 parts of normal butyl iodide at 95° C. for approximately three hours and then allowed to cool and stand over night whereupon the reaction becomes substantially complete. The mass is treated with an equal volume of aqueous sodium hydroxide with a liberation of formaldehyde and ammoniacal gases and a liberation of a non-volatile brown oil. After the bulk of the ammoniacal gases and formaldehyde have been removed the oil is separated from the remaining mass. The final product is a brown colored viscous oil smelling slightly of ammonia.

(3.) *Reaction of ethyl iodide and ethyl bromide with concentrated aqueous hexamethylenetetramine at 95–100° C.*—Hexamethylenetetramine solution is heated under pressure of 95–100° C. in a sealed container with two molecules of each of the alkyl halides employed separately. The heating is continued for approximately fourteen hours. Both the iodide and bromide reacted completely at the end of this time. The reaction product in both cases is treated with an equal volume of 50% aqueous sodium hydroxide, with a liberation of formaldehyde and ammoniacal gases. A thick light brown oil floated on the caustic solution in both cases, the products having in general the appearance of triethyltrimethylenetriamine.

The materials obtained in accordance with the procedures above described are relatively inexpensive and may be satisfactorily employed in the vulcanization of rubber. They represent accelerators which are substantially free from the tendency to prevulcanization. They have particular value in the so-called open air cure.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. A process for forming a formaldehyde condensation product which comprises causing hexamethylenetetramine to react with an alkyl halide, forming a condensation product of alkyl amine and formaldehyde thereby, and recovering said condensation product.

2. A process for forming a formaldehyde condensation product which comprises causing hexamethylenetetramine to react with an alkyl chloride, forming a condensation product of alkyl amine and formaldehyde thereby, and recovering said condensation product.

3. A process for forming a formaldehyde condensation product which comprises causing hexamethylenetetramine to react with an ethyl halide, forming the corresponding halide acid combination with triethyltrimethylenetriamine thereby, and separating the triethyltrimethylenetriamine.

4. A process for forming a formaldehyde condensation product which comprises causing hexamethylenetetramine to react with ethyl chloride, forming triethyltrimethylenetriamine hydrochloride, adding caustic alkali to the mass, and separating the triethyltrimethylenetriamine therefrom.

5. A process for forming a formaldehyde condensation product which comprises mixing a solution of hexamethylenetetramine with ethyl chloride, allowing the addition reaction to occur, heating the mass to effect hydrolysis, permitting the condensation of ethyl amine and formaldehyde to triethyltrimethylenetriamine hydrochloride to occur, adding caustic soda to the mass so obtained and separating the triethyltrimethylenetriamine.

Signed at New York, county and State of New York, this 22d day of November, 1922.

MORRIS G. SHEPARD.

Signed at Naugatuck, county of New Haven, State of Connecticut, this 18th day of November, 1922.

HAROLD S. ADAMS.